US008943565B2

(12) United States Patent
Magee et al.

(10) Patent No.: US 8,943,565 B2
(45) Date of Patent: Jan. 27, 2015

(54) RECOVERY OF INFORMATION FROM COMMERCIAL WEB PORTALS

(75) Inventors: John L. Magee, Castle Rock, CO (US); David Cannon, Silverthorne, CO (US); Darin Omtvedt, Parker, CO (US); Robert Larivee, Aurora, CO (US); Cory Harper, Fort Collins, CO (US)

(73) Assignee: Recondo Technology, Inc., Greenwood Village, CO (US)

( * ) Notice: Subject to any disclaimer, the term of this patent is extended or adjusted under 35 U.S.C. 154(b) by 253 days.

(21) Appl. No.: 13/356,461

(22) Filed: Jan. 23, 2012

(65) Prior Publication Data

US 2013/0191895 A1 Jul. 25, 2013

(51) Int. Cl.
*G06F 21/44* (2013.01)
(52) U.S. Cl.
USPC .............. 726/6; 726/2; 726/3; 726/5; 726/26; 726/27; 713/155; 713/156; 713/159
(58) Field of Classification Search
None
See application file for complete search history.

(56) References Cited

U.S. PATENT DOCUMENTS

2008/0306872 A1* 12/2008 Felsher ........................... 705/51
2009/0254978 A1* 10/2009 Rouskov et al. .................. 726/4
2010/0083358 A1* 4/2010 Govindarajan et al. ........... 726/6

OTHER PUBLICATIONS

Daniel Moser, Design and implementation of a runtime deadlock detection mechanism for SCOOP, 2005, Department of Computer Science, ETH Zurich, pp. 1-32.*
Agarwal et al., Run-Time Detection of Potential Deadlocks for Programs with Locks, Semaphores, and Condition Variables, 2006, PADTAD-IV, Jul. 2006, Portland, Maine, USA, ACM 1-59593-263-1/06/0007, pp. 51-59.*
Sandhu et al., Role-Based Access Control Models, 1996, IEEE Computer, vol. 29, No. 2, pp. 38-47.*

* cited by examiner

*Primary Examiner* — Jung Kim
*Assistant Examiner* — Adrian Stoica
(74) *Attorney, Agent, or Firm* — Swanson & Bratschun, L.L.C.

(57) ABSTRACT

Novel tools and techniques for automated recovery of information from commercial web portals, including commercial web portals requiring credentials for access. In some instances images are captured and pushed to external processes for improving system performance. In some instances access to automated software agent remote control modules is balanced across a system comprising a plurality of processors hosting the automated software agent remote control modules. Some instances provide provisioning of credentials, in particular indicating credentials available for an unlimited or a select limited number of users and monitoring credential use of those credentials usable by a select number of users. Some instances provide cache management optimizes retrieval of data by external processes and ensures reliability of such data to reduce unnecessary web portal inquiries.

11 Claims, 9 Drawing Sheets

RECOVERY OF INFORMATION FROM COMMERCIAL WEB PORTALS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to recovery of information from commercial web portals, and more particularly, to automated recovery of patient specific information from insurance company web portals by emulation of an interactive user.

BACKGROUND

Companies often need to elicit from other companies. For example, companies providing insured services (those who are paid in whole or in part by a party under a contract obligation, other than the party receiving the service) need certain information upon, or prior to acceptance of work, or delivery of services. In an insurance context, examples of the information needed may include:

Validity of Coverage
    Dates and what procedures are covered
    Limitations
    Co-Payments
    Maximums
    Deductibles
    Thresholds
    Reimbursement rates
Contractual Obligations of Provider and Payer In some instances it may also be necessary to receive a specific authorization prior to rendering a service.

Obtaining information of this nature is currently done either through a computer to computer transaction using an electronic data interchange ("EID") format or via telephone call from the service provider to the payer (i.e. insurer).

In an effort to streamline the flow of information and to minimize costs, payers have begun making information of the type described above available as interactive transactions over the internet to their website or web portal. As a result, time consuming and therefore expensive phone calls tying up the personnel time of the payer and the provider can be minimized as the provider can interactively query the payer's website to obtain this information. The information on the payer web portals is often more comprehensive than that available over EID transactions.

As an alternative to providers obtaining the information directly themselves, some third-party data sources will aggregate and provide such information on a fee-per-transaction basis.

Unfortunately, each of these common methods of obtaining information has recognized problems. EID data is often missing or incomplete. Telephone calls are very expensive due to personnel costs. Interactively accessing a payer's website is expensive, due to personnel costs associated with both extracting information from the websites and learning to navigate various payer websites, each of which may be unique in the presentation of information. Finally, third-party data sources are expensive and may raise concerns regarding the accuracy of data provided.

Accordingly, there is a need for tools and techniques that automate the process of querying payer web portals to acquire necessary information and authorizations while minimizing or eliminating expenditure of personnel time.

Automating the process of extracting information from payer web portals in an automated manner would ideally enable processing an inbound request from another program (or "external process") that supplies the information recovery system with search and navigation parameters, payer information, provider information and patient demographics to perform the desired search against the payer's web portal. However, development of such an automated system has proven very difficult for at least the following reasons:

Each payer's website is different in content and format.
Each payer's website is different in navigation rules.
Navigation to the needed data can be very complex.
Privacy rules require that users accessing a web portal be authorized to do so. In healthcare, the proof of authorization is referred to as a "credential" and a valid credential must be used to access the web portal.
Each provider has a very small number of credentials available for each payer.
There generally are too few credentials to really use or to attach to a session for extended periods.
Each credential may generally only be used serially. Any attempt to use a credential in more than one concurrent process will often be read as a security breach by the target web portal and the credential may be invalidated for future use.
A payer web portal may have a limited number of concurrent processes that may access it. This may be per source, per provider or in total for the site.

Hence, there is a need for more robust tools and techniques for accessing payer website data in an automated fashion.

BRIEF SUMMARY

A set of embodiments provides a software tool referred to herein as an "automated software agent" for interactively "impersonating" a human user conducting an Internet inquiry of an internet portal. Aspects of the automated software agent can include a set of "rules" and "configuration data," so that the Automated Software Agent can access and navigate various web portals to find desired information and/or read and parse resultant data streams. Aspects can further include parsing algorithms and program processes so that the automated software agent can recognize necessary information sets. Aspects of some embodiments include methods for "pushing" image information to external processes or programs. Aspects of other embodiments may further include controlling access to Automated Software Agent remote control modules across a network of cloud processors to make the remote control modules available for use to access discrete web portals in an efficient and organized manner.

Aspects of some embodiments include structured provisioning of credentials for efficiently accessing web portals, as required by external processes. In such embodiments, a pool of credentials might be maintained along with the credential properties to allow for allocation of credentials as necessary to access web portals for obtaining desired sets of patient-specific information. Aspects of embodiments can further include monitoring credential use and availability to optimize credential availability and minimize conflicting demands for credentials by the Automated Software Agent or Automated Software Agent remote controls. Aspects of some embodiments utilize cache management to minimize the need for time consuming queries of web portals where desired information, though time sensitive, can be retrieved from the cache with a high degree of reliability.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Specific embodiments of the disclosure include a method of pushing obtained images of a portal page containing information sets recovered from an insurance company web portal to an external process (e.g. program). The method comprises accessing an insurance company web portal with an automated software agent. An image of a portal page containing a set of patient-specific information is obtained with the automated software agent. A unique filename for the image is created and the image is stored in a database. The automated software agent invokes at least one external process and pushes the unique filename to the at least one external process. In some cases, invoking and pushing the unique filename to the external process may comprise identifying an operating system on which the automated software agent executes and selecting a method of invoking the external process based at least in part on the identification of the operating system. Embodiments may further comprise associating a processing status with filename, the processing status indicating at least one of whether the external process is in the process of executing the filename or has already executed the filename. In such embodiments the external process may execute a filename only if it is not in the process of executing or has not already executed the filename. Embodiments may further include invoking more than one external process with the automated software agent and passing the unique filename to each invoked external process.

Further specific embodiments of the disclosure may include a method of load balancing automated software agent remote control module reservations across an automated software agent grid comprising more than one cloud processor hosting automated software agent remote control modules. One such method comprises providing a global automated software agent remote control module pool database comprising a list of web browsers supported by the automated software agent. Also provided is an automated software agent remote control module provisioner database comprising a list of processors hosting automated software agent remote control modules. Further provided is a remote control database comprising a list of automated software agent remote control modules associated with each processor. The computer system might receive a user request for an automated software agent remote control module and matches the user request to one of the list of web browsers. The computer system might query the software agent remote control module provisioner database to identify a processor of the list of processors having the fewest active automated software agent remote control modules supporting the matched web browsers. An automated software agent remote control module hosted by the identified processor is selected. A reference to the selected automated software agent remote control module is returned in response to the user request.

Embodiments may further include determining if a selected automated software agent remote control module is functioning properly. If the selected automated software agent remote control module is not functioning properly, the selected automated software agent remote control module is marked. Such embodiments may further include selecting another automated software agent remote control module while skipping any marked automated software agent remote control modules. Such embodiments may further include setting a timer when marking the selected automated software agent remote control module and when the timer expires, deleting the marking from the selected automated software agent remote control module.

A further specific embodiment of the disclosure is a method of provisioning credentials to an automated software agent for accessing an insurance company web portal for the purpose of obtaining patient-specific information for a patient of interest. The method may comprise providing a credentials database for storing credentials useable by the automated software agent for accessing an insurance company web portal. Various properties of the credential are associated with the credential. Properties may include, by way of example, each role the credential can enable on the insurance company web portal. Each credential and its associated properties are stored in the credentials database. The automated software agent identifies a credential for use in accessing a select insurance company web portal. The automated software agent queries the database to determine if the identified credential can enable a select role or a select group of roles and to determine if the identified credential is available for use. The computer system provides the identified credential to the automated software agent for its use in accessing the select insurance company web portal only if the identified credential can enable the select role or group of roles and the identified credential is available for use and after setting an in-use window having an in-use expiration time and associating the in-use expiration time with the identified credential and storing the in-use expiration time in the credentials database.

This embodiment may include, if the user cannot access the insurance company web portal using the identified credential, associating with the identified credential a lockout window having a lockout expiration time. The computer system stores the lockout expiration time in the credentials database and prevents use of the credential until termination of the lockout expiration time.

This embodiment may further include the computer system associating with each credential any expiration date set by the insurance company web portal and updating the credential as necessary to allow access to the insurance company web portal.

This embodiment may further include the computer system determining if a credential to be stored in the credentials database may be used simultaneously by unlimited multiple users to access an insurance company web portal. In this circumstance the computer system associates with the credential an unlimited use role. For each credential with an unlimited use role, the setting of an in-use expiration time is prevented when the credential is returned to a user as an identified credential. In this manner in-use expiration time is always in the past which results in the credential always being available to a user.

This embodiment may also include the computer system determining if a credential stored in the credentials database may be used simultaneously by a select number of multiple users to access an insurance company web portal. In such an embodiment, the computer system associates a counter with the credential to count the number of users simultaneously using the credential and does not return the credential to the automated software agent if the number of users simultaneously using the credential counted by the counter is equal to the select number of users.

Another aspect of this embodiment may include a plurality of instances of the automated software agent, each of the plurality of the instances of the automated software agent having associated therewith an identifier that uniquely identifies that instance of the automated software agent within the computer system. This aspect would further include maintaining a list of identifiers of currently running instances of the automated software agent, with the list associating with each currently running instance of the automated software agent one or more credentials currently used by that currently-running instance of the automated software agent, a status of that instance of the automated software agent and a set of one or more dispatch parameters corresponding to that instance of the automated software agent. "Dispatch parameters" might include, by way of example, a timestamp (start, end), method invoked, credential id, payer URL, and patient ID and other such information. Such an aspect may further include identifying from the list of identifiers, a conflict between two or more instances of the currently running automated software agent and resolving the conflict by terminating one or more of the currently running instances of the automated software agent.

Aspects of this embodiment may further include determining from the list of identifiers that a currently running instance of the automated software agent has failed and terminating the failed currently running instance of the automated software agent.

A further aspect may include analyzing how the instances of the automated software agent accesses resources for the purpose of eliminating future conflicts between instances of the automated software agent acquiring a credential.

Yet another specific embodiment of the disclosure is a method of utilizing a computer cache to optimize obtaining time variable information from a web portal using an automated software agent. Embodiments comprise accessing, with an automated software agent, a web portal containing time variable information. The automated software agent obtains a set of elements of time variable information. The set of time variable information is date stamped and stored in a computer cache as a reference set of elements of time variable data. The automated software agent accesses the web portal containing the time variable information and obtains a later set of elements of the time variable information. The later set of elements of the time variable information is date stamped. The automated software agent compares the reference set of elements of time variable information and the later set of elements of the time variable information to identify any changes between common elements of the reference set of elements of time variable information and the later set of elements of the time variable information. Elements of the reference set of time variable information are replaced with common elements of the later set of the time variable information in the computer cache if there are differences between the common elements of the reference set of time variable information and the later set of the time variable information. Each element of the reference set of elements of time variable information and the corresponding element of the later set of elements of the time variable information are analyzed as a function of the difference between date stamps to establish criteria for determining whether the automated software agent can rely on the reference set of data in the cache in a future query to obtain an element of time variable information or whether the element of time variable information must be accessed from the web portal. The criteria are associated and stored with each element of the reference set of time variable data in a database.

Aspects of this embodiment may further include the step of analyzing each element of the reference set of elements including storing information about comparisons in a database and evaluating information in this database to optimize criteria of data type and age for determining whether the automated software agent can rely on the reference set of data in the cache in future queries. The optimized criteria are associated and sorted with each element of the reference set of time variable data in a database.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
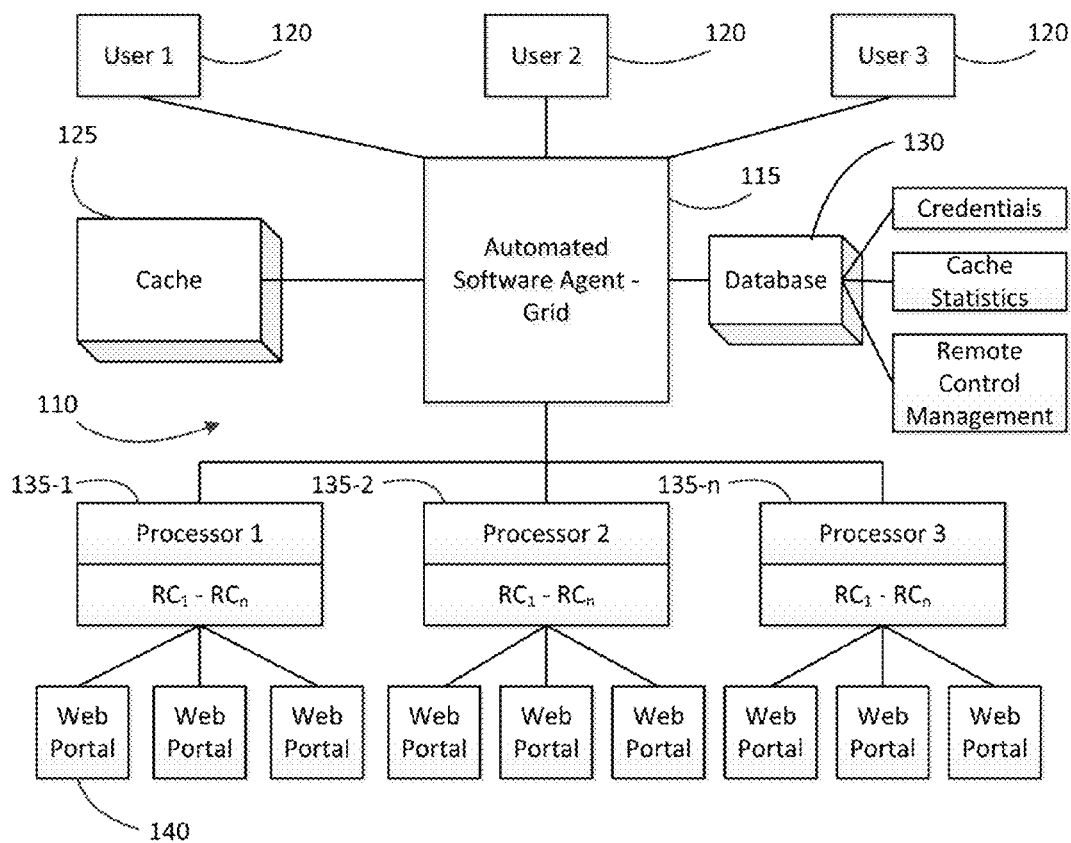
FIG. 1 is a functional block diagram illustrating a system for recovery of information from commercial web portals in accordance with various embodiments.

FIG. 1 is a functional block diagram of a system 110 for recovery of information from commercial web portals. The system 110 comprises an automated software agent 115 which may one or more programs, services, daemons, scripts and/or other executable code hosted on a single or multiple processors. A number of users 120 interface with the automated software agent 115. The users 120 direct requests for information to be collected by the automated software agent 115 from various commercial web portals. The automated software agent 115 is associated with a cache 125 for transient storage of information and a database 130 for persistent storage of information such as credentials used for accessing web portals, statistics related to management of the cache 125 and information related to management of remote controls operatively associated with the automated software agent 115.

The automated software agent 115 is further in communication with a number of processors illustrated as 135-1, 135-2, 135-n, which might be implemented as different computers, different processors or cores within a single computer, or using any other appropriate hardware architecture. In other cases, the functionality attributed to the multiple processors 135 can be performed by a single processor. A number of automated software agent remote control instances indicated as $RC_1$-$RC_n$ are associated with each processor. The remote control instances $RC_1$-$RC_n$ are functional for accessing web portals for accessing desired information as will be described in greater detail below. As used herein the "automated software agent" includes the remote control instances. Reference to an "instance" of the automated software agent is intended to include instances of the automated software agent as a whole or an "instance" of a software remote control agent, unless it is clear in the context that "instance" is intended to be limited to only the automated software agent as a whole.

In one embodiment the system 110 including the automated software agent 115 comprises a set of computer programs that take a request from a user 120 (also referred to as an external process or program) and process that request interactively as if it were a human operator against various web portals 140 to gather desired information in an automated manner. One example of a tool that can be implemented as part of as the automated software agent platform is an open source product called Selenium™, which acts as a driver between the users 120 and the payer's web portals 140. Selenium™ is an open source software testing tool that allows user to drive different browsers from a Java-based application to test their own web portals in an automated manner. Selenium™ is made up of three components, Selenium™ Core, Selenium™ Remote Control and Selenium™ Grid.

Selenium™ Core consists of a Java scrip API that runs inside the browser to control the browser.

Selenium™ Remote Control acts as a driver for the Selenium™ Core. It comes in two parts. The first is a Java based proxy application that takes HTTP, posts commands and forwards them to Selenium™ Core running inside the appropriate browser. It launches different browsers and loads the Java script into them. Second, Selenium™ Remote Control comes with drivers for multiple languages including the Java one.

Selenium™ Grid is a Java based applications that listens for HTTP commands on a single port and passes those commands on to specific remote control instances. Selenium™ Grid allows Selenium™ Remote Controls to be run in a scaled production environment.

Critical to scaled and reliable application of the system 110, is effective management of the remote controls. This is accomplished by effectively deploying multiple grid configurations in the event a grid becomes completely inactive or a grid is lost due to a hardware failure.

In some aspects, the automated software agent 115 comprises and accesses a number of remote control instances, each of which are associated with various processors, which could, for example, be part of a cloud configuration. The automated software agent 115 includes an automated software agent 115 grid program which enables the deployment of the various remote controls across multiple virtual and physical processors. In one embodiment, as discussed above, the automated software agent 115 may be Selenium™.

One application of the system 110 is in the field of healthcare where the users 120 comprise various service providers seeking to access the web portals of payers or insurers for the purpose of determining information related to the coverage of an insured person seeking services from the provider. While in some instances the discussion herein will relate to this specific application of the system 110, unless entirely clear from the context, the system 110 is not intended to be limited to this specific application.

FIGS. 2-7 illustrate various methods that can be used in association with the system 110 for recovery of information from commercial web portals. While the methods of FIGS. 2-7 are illustrated, for ease of description, as different methods, it should be appreciated that the various techniques and procedures of these methods can be combined in any suitable fashion, and that, in some embodiments, the methods depicted by FIGS. 2-7 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2-7 can be implemented by (and, in some cases, are described with respect to) the system 110 of FIG. 1 (or components thereof), these methods may also be implemented using any suitable hardware implementation. Similarly, while the system 110 of FIG. 1 (and/or components thereof) can operate according to the methods illustrated by FIGS. 2-7 (e.g., by executing instructions embodied on a computer readable medium), the system 110 can also operate according to other modes of operation and/or perform other suitable procedures.

Figure 2:
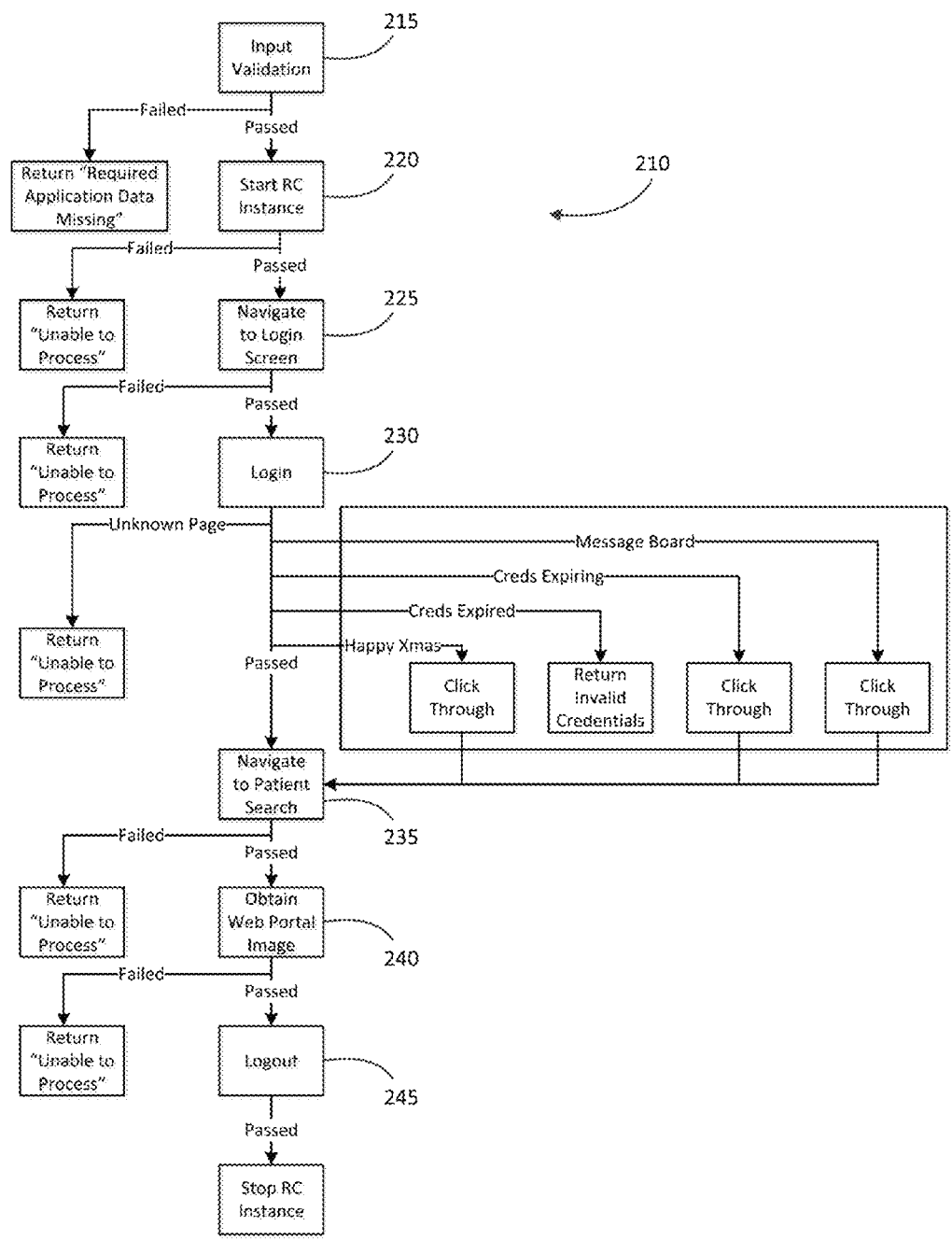
FIG. 2 is a process flow diagram illustrating a general process for obtaining information from a web portal, in accordance with various embodiments.

For instance, FIG. 2 is a process flow diagram illustrating a general process for obtaining information from a web portal using the system 110. In one embodiment the method 210 is implemented using the automated software agent platform described above, which can be a Java Application Program Interface ("API") that opens a URL to a commercial web portal and interacts dynamically through implementation of the method 210.

Each implementation and instance of the method 210 might implement a standard interface. The interface takes a plain old Java object (POJO) that contains information necessary to extract desired information from the commercial web portal. For example, in an embodiment where a provider is accessing an insurer's website, such information may include information about the payer, information about the provider, information sought from the web portal and the provider's credentials to use when logging in to the payer's portal. The method 210, in some cases, returns data from the web portal (which can include an image of the web portal, as described below) or error messages, as appropriate.

At block 215, the method 210 comprises receiving and/or validating the request for information (e.g., patient information) from a particular web portal. Validation comprises verifying that the request includes sufficient information to do at least one patient search. Embodiments may validate other input information based on known restrictions of the payer (e.g., member ID length must be a select number of characters). If the request passes validation, at block 220 an instance of an automated software agent remote control is accessed (and/or started as necessary). The automated software agent remote control is in turn used to navigate to a web portal login screen at block 225 and log in to the web portal at block 230. Once the remote control has successfully logged in, at block 235, it navigates the web portal to perform a patient search. Different web portals may allow searching for patient information in more than one way. Embodiments may, for example, allow searching by member ID alone or they may require last name or date of birth information. To accommodate the demands of various web portals, the method 210 utilizes a waterfall search in various embodiments to perform the patient search. Once the desired patient information is identified, the requested information is captured (block 240); such information which can include, without limitation, available information about the patient's plan and demographics, such as a patient's member ID, name, date of birth, relationship code, gender and plan description. In some cases, the captured information includes an image of the web portal from which the information was captured. At 245 the remote control logs out and becomes available for use by another instance.

In order to provide substantiation that the response returned from an execution of the automated software agent 115 is accurate, an image is taken from any portal page from which information is extracted. In an aspect, an image can be any representation of a web portal or page that includes sufficient information to allow validation and/or substantiation that the captured information was captured from the appropriate web portal and/or pertains to the appropriate patient. Thus, an image can include, inter alia, a screen capture of a portal web page, a timestamp, a URL, a digital signature and/or certificate, and/or other verification information, and/or the like. These images may be useful in the event some other user or external process has a need for the information recovered, or if there is ever a question about the validity of the information. To make the image available, a filename is created for the image and the image is moved to a substantiation store accessible by external processes. Typically, such external processes would poll the substantiation database for image data. However, polling for this data is inefficient because it increases network traffic and disc input and output. Thus, certain embodiments provide tools for providing image data without requiring polling by external processes.

Figure 3:
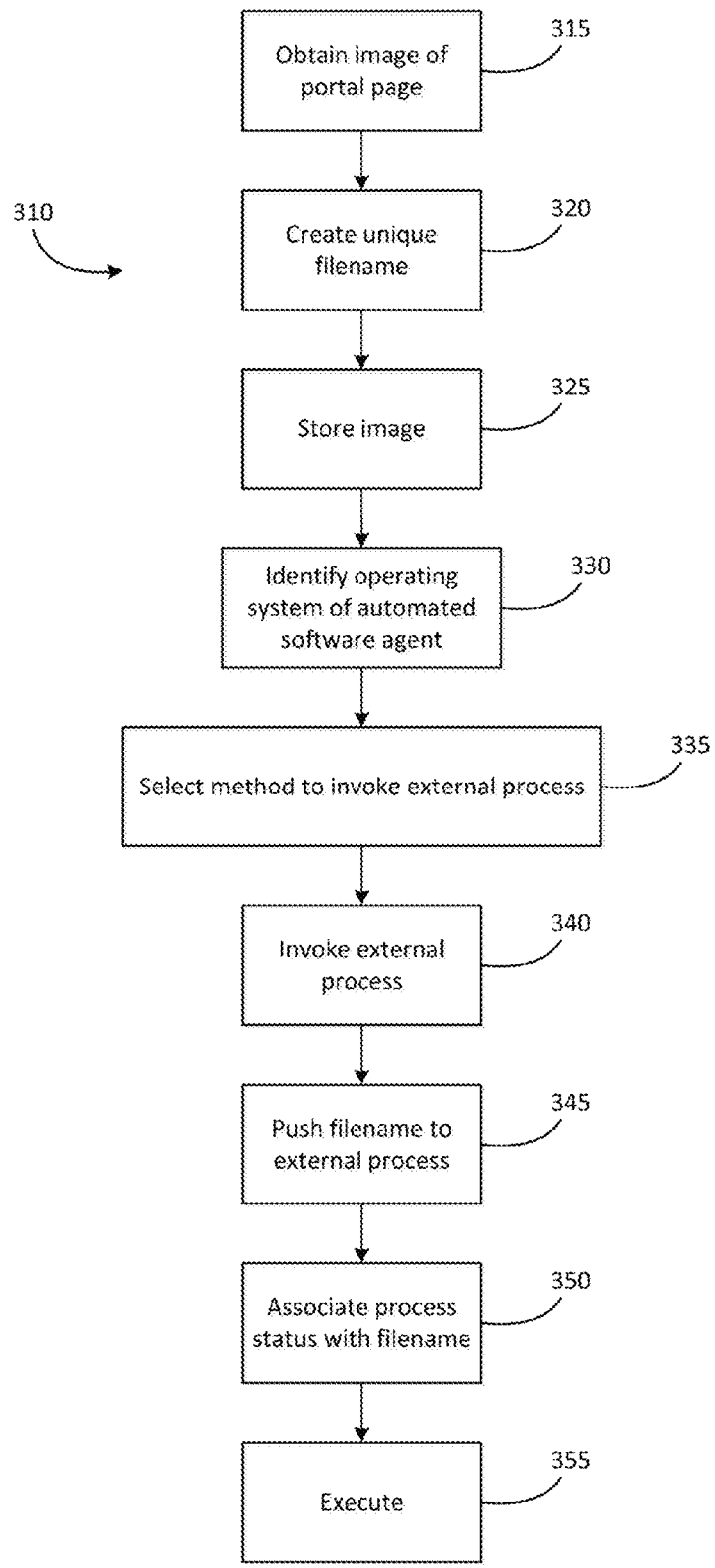
FIG. 3 is a process flow diagram illustrating a method of pushing obtained images of portal page information sets recovered from a web portal to an external process, in accordance with various embodiments.

Merely by way of example, FIG. 3 is a process flow diagram of a method 310 of "pushing" obtained images of a portal page to an external process. At block 315 an image of a portal page is created (e.g., as part of the method 210 described above). In some embodiments, a browser accessing the portal page can take an image of an entire page. In other instances, for example when the browser is Internet Explorer, an image can only be taken of a portion of a page that is visible at the time the image is captured. To work around this issue, embodiments include scrolling and capturing a plurality of screen images as necessary to obtain the full image of a portal page when the automated software agent 115 is executed. Once the image is captured, a unique file name is created for the image at block 320. At block 325, the image is stored in a substantiation database accessible by various external processes that can be invoked.

In some cases, external processes (such as instances of the software agent 115) might execute on a variety of different platforms having different operating systems. In such cases, the procedures for invoking the external process might vary between platforms and/or operating systems. Embodiments may further include, at block 330, identifying an operating system of the automated software agent 115. At 335, depending on the operating system of the automated software agent 115, embodiments may select a method to invoke various external processes that may have a need for the stored image. For example, if the operating system is Linux, a Java Runtime Executor might execute a shell script (e.g., a Bash script), Perl script, and/or the like. If the operating system is Windows, a Java Runtime Executor is used to execute a DOS batch file. Alternatively and/or additionally, a platform-specific compiled launcher program might be used to invoke an external process. In any event, at block 340 the external process or processes are invoked (e.g., using the selected technique, depending on the platform). At block 345, the filename is "pushed" to the external processes for execution by the external processes, for example, by passing the filename to the invocation script, etc.

Certain embodiments could also include (at block 350) associating a process status with a filename. For example, the process status could indicate at least one of whether the external process is in the process of executing the filename or has already executed the filename. In certain embodiments, if the external process is executing the filename (e.g., processing the image referenced by the filename or taking some other specified action with respect to the file) or has already executed the filename the external process will not execute the pushed filename.

Figure 4:
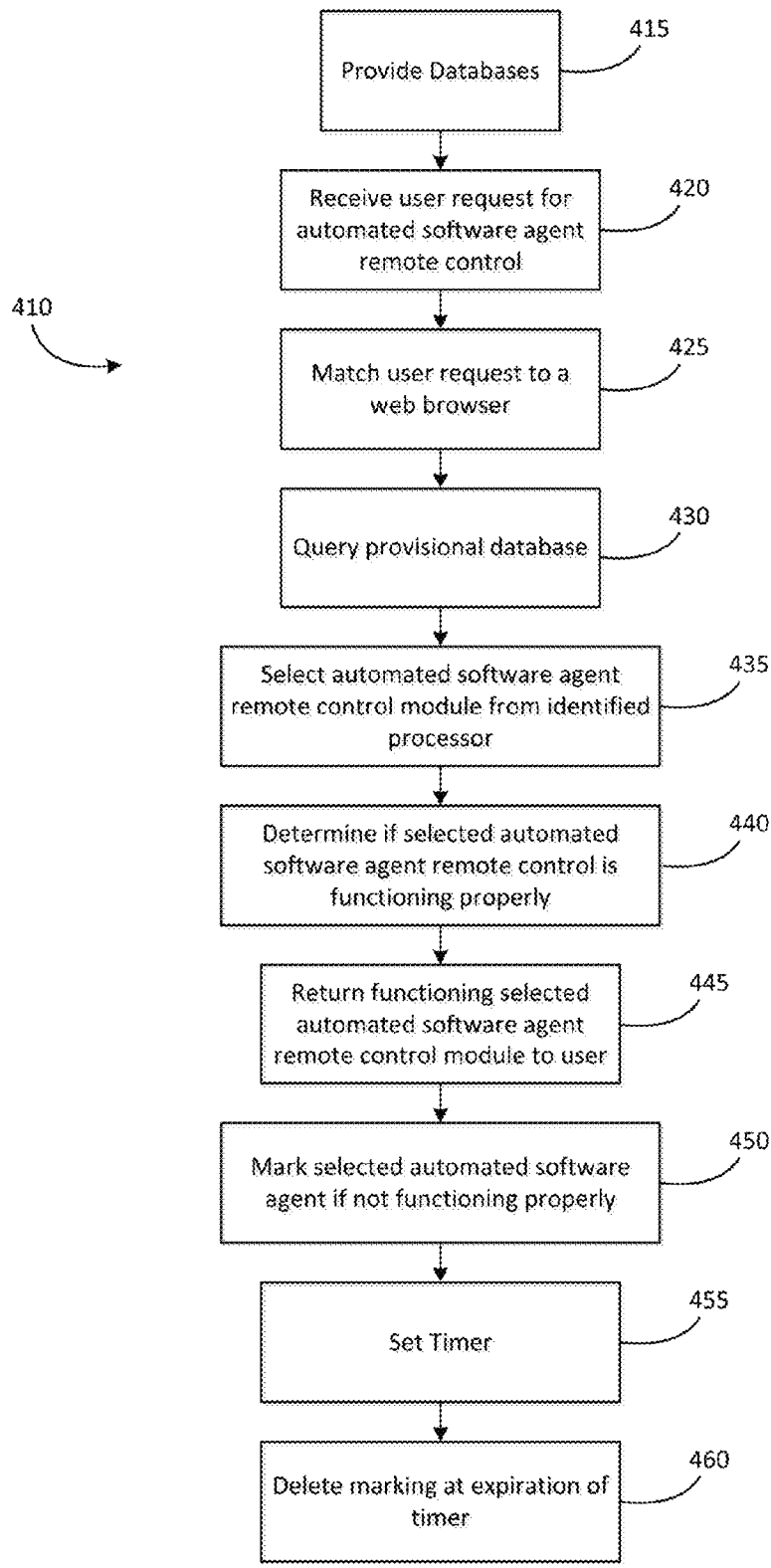
FIG. 4 is a process flow diagram of a method of load balancing automated software agent remote control module reservations across a system for recovery of information from commercial web portals, in accordance with various embodiments.

FIG. 4 is a functional block diagram of a method 410 of load balancing automated software remote control reservations across a system for recovery of information from commercial web portals. The method comprises, at block 415, providing a number of databases are. As used herein, the term "providing," with respect to a database, can include one or more of several operations, including without limitation creating the database, maintaining (e.g., compacting, etc.) the database, making the database available for queries, storing the database (e.g., on a computer readable medium), and/or the like. Essentially, providing a database can include any action that makes the database available for use by various embodiments. A number of different databases may be provided in accordance with different embodiments. For example, a remote control pool database might include a list of web browsers supported by the automated software agent. The web browsers could include, but are not necessarily limited to, Microsoft Internet Explorer, Mozilla Firefox and Google Chrome. Some embodiments might include an automated software agent remote control provisioner database comprising a list of processors hosting automated software agent remote controls. Other embodiments might include a remote control database comprising a list of automated software agent remote control modules associated with each processor. (It should be noted, of course, that, while these databases are described separately for illustrative purposes, these databases can be provided as one or more tables within a single database; in other cases, there might be additional databases, and/or data can be divided between one or more databases in a fashion different than that described herein. Thus, the number and arrangement of the databases is implementation-specific, and the examples provided herein should not be considered limiting.)

At block 420, a user request for an automated software agent remote control is received by the system 110. Such a request can be received from a variety of entities (each of which can be considered a "user" for purposes of the method 410), including without limitation, a human user, an external process (running on the system 110 or another computer), and/or the like. At block 425, the user request is matched to a compatible web browser. For example, a particular request might pertain to a web portal that requires the use of Internet Explorer. In such a case, that request might be matched with Internet Explorer as the compatible web browser. At block 430, the provisioner database is queried to identify a processor from a list of processors having the fewest active automated software agent remote control modules supporting the matched web browser. At block 435 an automated software agent remote control module is selected from the identified processor. In an aspect, the selected module executes on the identified processor.

A number of techniques can be used to prioritize the selection of a remote control module. For example, in some cases, a round-robin allocation technique can be used. In other cases, existing load on each processor might be taken into account when selecting a remote control module. Other considerations are possible as well. In one aspect, the selection operation might include skipping (i.e., disregarding for selection purposes) any instances of the automated software agent remote control module that are marked as not functioning properly. Thus, at block 440, the method 410 comprises determining whether the selected automated software agent remote control is functioning properly. At block, 445 a functioning, selected automated software agent remote control module is returned in response to the request. However, if it is determined that the selected automated software agent remote control is not functioning properly, the automated software agent remote control that is not functioning properly is marked (block 450), and the method 410 returns to step 420 to repeat the selection process. In some cases, when an agent is marked as non-functioning, the method 410 includes setting a timer (block 455) to specify a duration for which the module should be marked non-functional, in order to enable later selection of the remote control module (e.g., in case the module returns to functional status in the interim). At 460, after expiration of the timer, the marking is deleted.

The method 410 can be repeated from step 425 until a remote control that functions properly is selected in response to the request. If an automated software agent remote control module that functions properly cannot be identified, an error is returned in response to the request.

In an aspect, the method 410 of load balancing automated software agent remote control reservations can spread the use of remote controls over any number of virtual or actual processes associated with the grid. This can prevent aggregation of remote control instances on a single machine, thereby enhancing performance of the system as a whole. Furthermore, the method 410 allows for searching for a functioning remote control instance across all available processors in a grid system, so that all possible remote control instances can be investigated before an error is returned to the requester. Further, the method 410 recognizes that remote control instances can become unresponsive for reasons other than a complete remote control failure. For example, browser hangs, machine failure and network connectivity issues all can present transient non-functionality conditions. The use of the marker and timer allows the system to determine if the remote control failure is temporary so that the remote control can reenter use if the failure to function is not attributable to a complete remote control failure.

Another aspect of certain embodiments provides control over credential use. As used herein, a "credential" is a valid authorized user identifier and password that is used with the permission of both the requesting user and the owner of the servicing web portal. For an automated software agent remote control to access many commercial web portals, it must use a valid credential. In general, credentials may only be used serially. An attempt to use a credential in more than one concurrent process will often be read as a security breach by the web portal and the credential may be invalidated for future use. For a system 110 for recovery of information from commercial website portals to work efficiently, effective management of access to credentials is critical.

Figure 5:
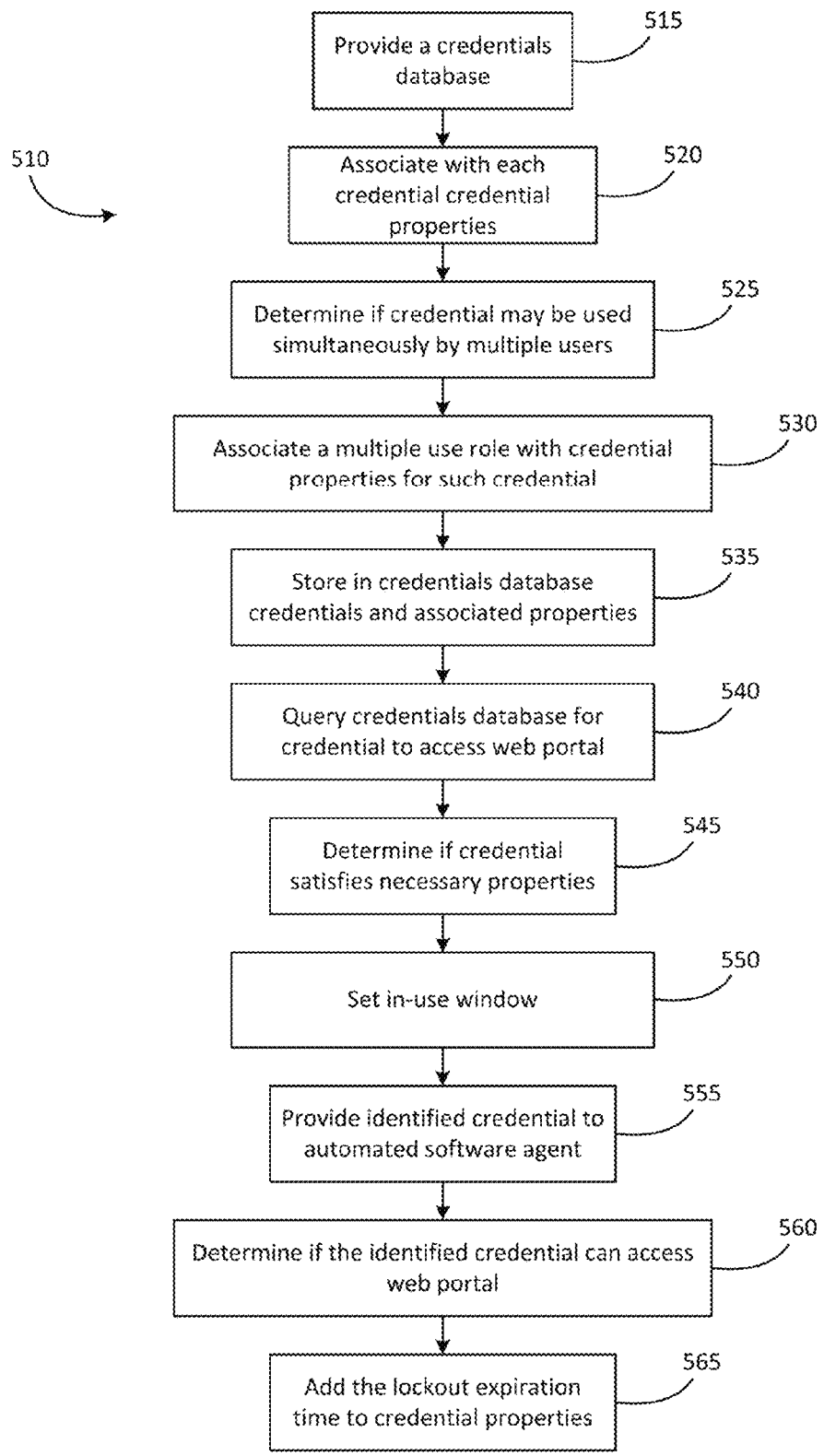
FIG. 5 is a process flow diagram of a method of provisioning credentials to an automated software agent for accessing insurance company web portals, in accordance with various embodiments.

Hence, FIG. 5 illustrates a method 510, in accordance with one set of embodiments, of provisioning credentials to an automated software agent (or an automated software agent remote control) for accessing a commercial web portal for the purpose of obtaining desired information. In one embodiment, the method may be used for accessing an insurance company web portal for the purpose of obtaining patient-specific information for a patient of interest, although various embodiments are not limited to this particular use case. The method 510 manages the use of credentials across multiple applications (which can be running on multiple physical or virtual processors) for a variety of purposes. Useful features of the method 510 include, without limitation, enabling access to a credentials database for instances of an automated software agent (or automated software agent remote control) to have access to current and correct credential information. Another useful feature can be to allow for credentials to be reserved from and returned to a credentials pool so that only one web session may have an individual credential in use at any given time, if appropriate, and when finished, the credential is rendered available for use by another instance of the automated software agent or automated software agent remote control. A further useful feature can enable establishment of priorities for use of credentials amongst competing users and assign credentials from the "pool" based on these priorities. Yet another useful feature can accommodate situations where multiple users may access a credential at once and if the number of users is limited, tracking the number of users to prevent a violation of limitations on the number of credential users. The method 510 can also provide credentials with a high likelihood of functioning properly.

The method 510 includes, at block 515, providing a credentials database for storing credentials. At block 520, the method 510 includes associating properties and/or roles with each credential (e.g., by storing in the database an association between a credential and the applicable properties or roles, either as fields in a credential records, relational links between credential records and property records, or any other appropriate technique, which can depend on the database architecture, which, as noted above, is discretionary). Properties may include, for example, the identity of a commercial web portal, user name and password associated with the credential, whether the credential is checked in and thus available or checked out and therefore unavailable, a time when a checked out credential will be checked in and different roles a credential can enable. "Roles" may be application specific or user specific. For example, returning to the example of the web portal being a payer portal and the user being medical service provider, a role could exist for claims status and eligibility and benefits applications. Roles could also exist for developer and production users. For example, if a credential can only be used by production users of eligibility and benefits applications, the two roles would be specified as properties in the credentials database. If it could also be used by production users in the claims status application, a further claims status application would be added to the credential. In various embodiments, a credential can be assigned many roles which are then checked when a credential is investigated for use. Additional properties might include whether a particular credential may be used simultaneously by multiple users. At block 525, the method 510 includes determining whether a credential can be used simultaneously by multiple users. If the credential may be used simultaneously by multiple users, a multiple use role is associated with the credential properties for such credentials (block 530). In some embodiments, the multiple use role might allow for unlimited concurrent use by multiple users. In other embodiments, the multiple use role enable only a limited select number of concurrent users. At block 535, the credential and associated properties are stored in the credentials database.

At block 540, the method 510 comprises querying the credentials database\ for credentials to access a select web portal. In an exemplary embodiment, the query might identify the web portal and properties required of the credential, such as roles the credential can enable.

At block 545, the system determines whether the identified credential is available for use. For example, if a credential is a single-use (or limited-use) credential, an in-use window might be set (block 550) to indicate that the credential is currently in-use (and therefore unavailable) with the in-use window including an in-use expiration time, which is then added to the credential properties in the credentials database. If the credential is marked as in-use, the system would determine (at block 545) that the credential is not available. In those instances where the credential has a multiple use role enabling unlimited concurrent users to use the credential, setting of an in-use expiration time is prevented. In this manner, the in-use expiration time for such an unlimited use credential would always be in the past and result in the credential always being available to a user. In those instances where a credential may be used simultaneously by a select number of multiple users, a counter is associated with the credential to count the number of users simultaneously using the credential. The method will not return a credential to the automated software agent if the number of users simultaneously using the credential counted by the counter is equal to the select number of users.

At block 555 an identified credential is provided by the system to the automated software agent, if available. At block 560, the method comprises determined if the credential can provide access to the web portal (e.g., whether the agent can successfully log on to the portal with the credential). If not, a lockout window having a lockout expiration time is associated with the credential, and the lockout expiration time is added to the properties in the credentials database (block 565). The system prevents the use of the credential until termination of the lockout expiration time. After the expiration of the lockout time, the software agent (or another software agent) might re-attempt to access the portal. This can prevent fatal lockout conditions for transient failures (such as a case where the portal happens to be generally unavailable at a certain time, due to user load, maintenance, etc., simultaneous use of the credential by the actual patient, etc.)

Embodiments may also include associating with each credential any expiration date set by the web portal. Such embodiments may further include the system updating the credential as necessary to allow access to the insurance company web portal.

Figure 6:
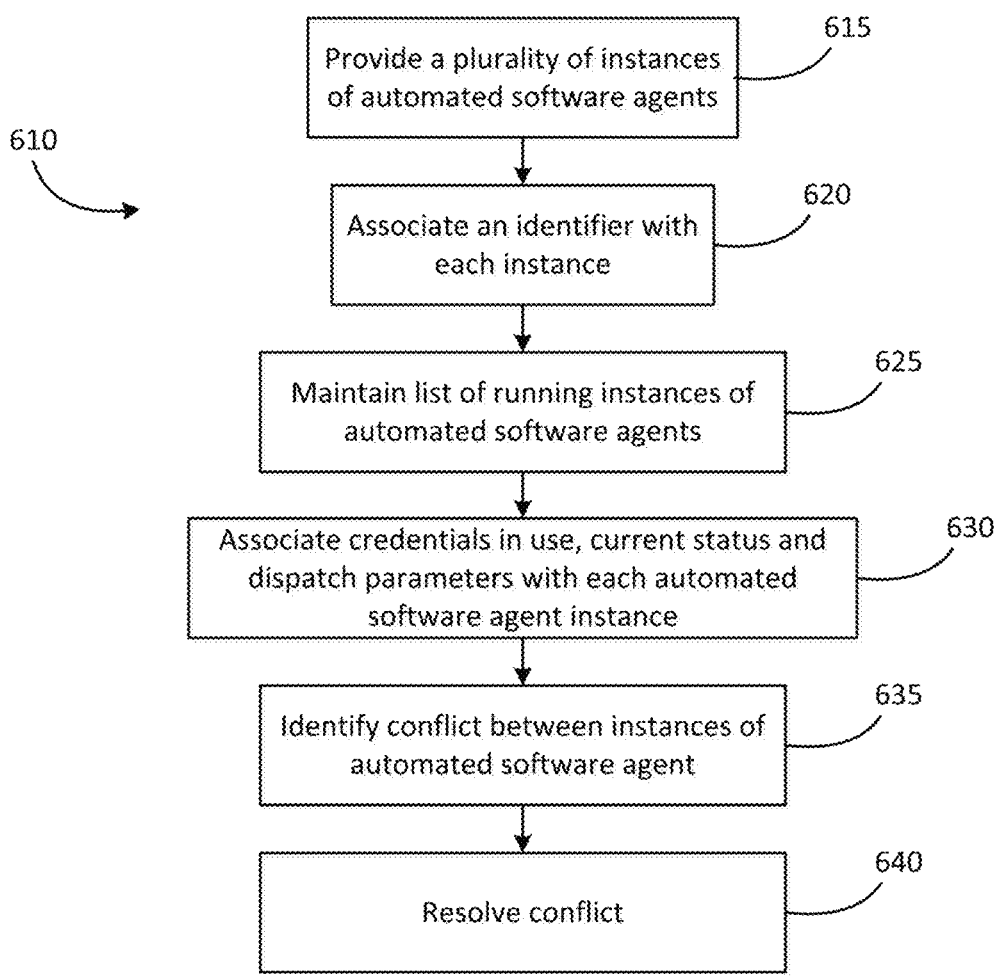
FIG. 6 is a process flow diagram of a method of identifying and resolving conflicts between instances of an automated software agent, in accordance with various embodiments.

Embodiments may also be provided to include functionality for identifying instances of automated software agent remote control (or an automated software agent) and identifying and resolving conflicts between instances of automated software agent remote controls, so as to prevent the instances of the automated software agent remote controls from tying up resources (such as, for example a race condition between two instances). One such method 610 is illustrated in FIG. 6. In the illustrated embodiment, a plurality of instances of the automated software agent remote controls are provided (block 615). At block 620, an identifier is associated with each instance of the automated software agent remote control. At block 625, a list of running instances of automated software agents is maintained (e.g., in a database), and at block 630 credentials currently in use, current status and dispatch parameters are associated with each automated software agent remote control instance. At block 635, conflicts between instances of automated software agent remote controls are identified and at block 640, such conflicts are resolved at 640. Examples of "conflicts" include, but are not limited to, competition for a credential or a duplication of a credential. The conflicts may be resolved, for example by terminating an instance of one of the conflicting automated software agent remote controls. Another embodiment may include a step of determining from the current status of an instance of an automated software agent remote control that the remote control has failed. Such an embodiment would further include terminating the failed currently running instance of the automated software agent remote control. The method may further include the step of analyzing instances of how the automated software agent remote control accesses resources for the purpose of eliminating future conflicts between instances of automated software agent remote controls acquiring a credential.

Embodiments of the system 110 of FIG. 1 can also include tools and techniques for optimizing a system cache 125. Optimizing cache utilization can eliminate a resource consuming access of a web portal while still providing accurate time variable information.

Figure 7:
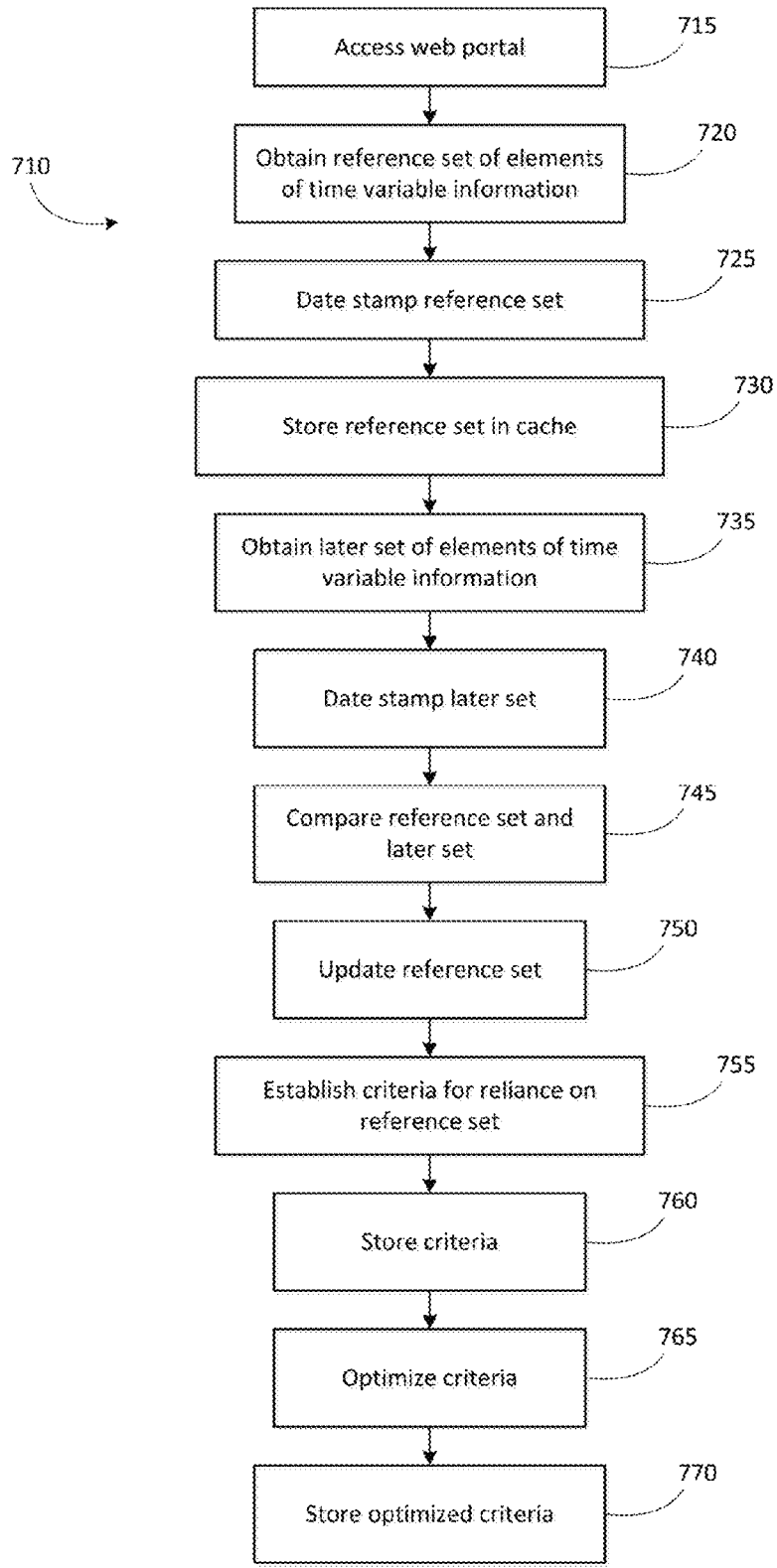
FIG. 7 is a process flow diagram of a method of utilizing a computer cache to optimize obtaining time variable information from a commercial web portal using an automated software agent, in accordance with various embodiments.

A method 710 of utilizing a computer cache to optimize obtaining time variable information from a commercial web portal using an automated software agent is illustrated in FIG. 7. The method 710 includes accessing, with an automated software agent, a web portal containing time variable information (block 715). The set of elements of time variable information may include an image of a web portal page, other information captured from the page, etc. At block 725, the set of time variable information is date stamped, and at block 730 the set of time variable information is stored as a reference set in the computer cache. At block 735, a later set of elements of the time variable information is accessed with the automated software agent from the web portal. This later set of elements of time variable information is date stamped at block 740. At block 745, the reference set and the later set of elements of time variable information are compared to identify any changes between common elements of the reference set of elements of time variable information and the later set of elements of time variable information. At block 750, the reference set is updated by replacing the elements of the reference set of time variable information with common elements of the later set of time variable information in the computer cache, if there are differences between the common elements of the reference set of time variable information and the later set of time variable information. At block 755 each element of the reference set of elements of time variable information and the corresponding elements of the later set of elements of time variable information are analyzed as a function of the difference between the date stamps to establish criteria for determining whether the automated software agent can rely on the reference set (or elements of the data comprising the reference set) in the cache in a future query to obtain an element of time variable information or whether the element of time variable information must be accessed from the web portal. For example, if a number of sequential captures of the information indicates that the information is static for a period of several months before changing, a reference set of the data that is younger than this length of might be assumed to be current, while a reference set of the data older than this length of time might be assumed to be out-of-date, in which case the data needs to be recaptured from the portal (and the reference data refreshed, as described above). At block 760, these criteria are associated with and stored with each element of the reference set of time variable information in the database.

Embodiments may further include optimizing the criteria at block 765. The operation of optimizing can comprise storing information about the comparisons in a database and evaluating information in this database to optimize criteria of data type captured from the portal, properties of the request (for example, the nature of a procedure to be performed, the payer, the provider, geographic information (e.g., state, county, SMSA), insured group (e.g., teachers, auto workers, teamsters), patient occupation, date (e.g., time variable information may be known to vary at specific dates for example at the new year)) and age of the data in the cache for determining whether the automated software agent can rely on the reference set of data in the cache in accordance with the requirements of the provider or payer in future queries. For example, certain providers may demand that approval of certain procedures require a higher degree of reliability for the time variable information that is stored in the cache than other procedures, and thus for such procedures an element of time variable information must be accessed from the web portal while for another procedure the time variable information could be retrieved from the cache. At block 770, the optimized criteria are associated with and stored with each element of the reference set of time variable information in the database.

Embodiments may further including adding any element of the later set of time variable information not in the reference set of elements of time variable information to the reference set of time variable information.

Figure 8:
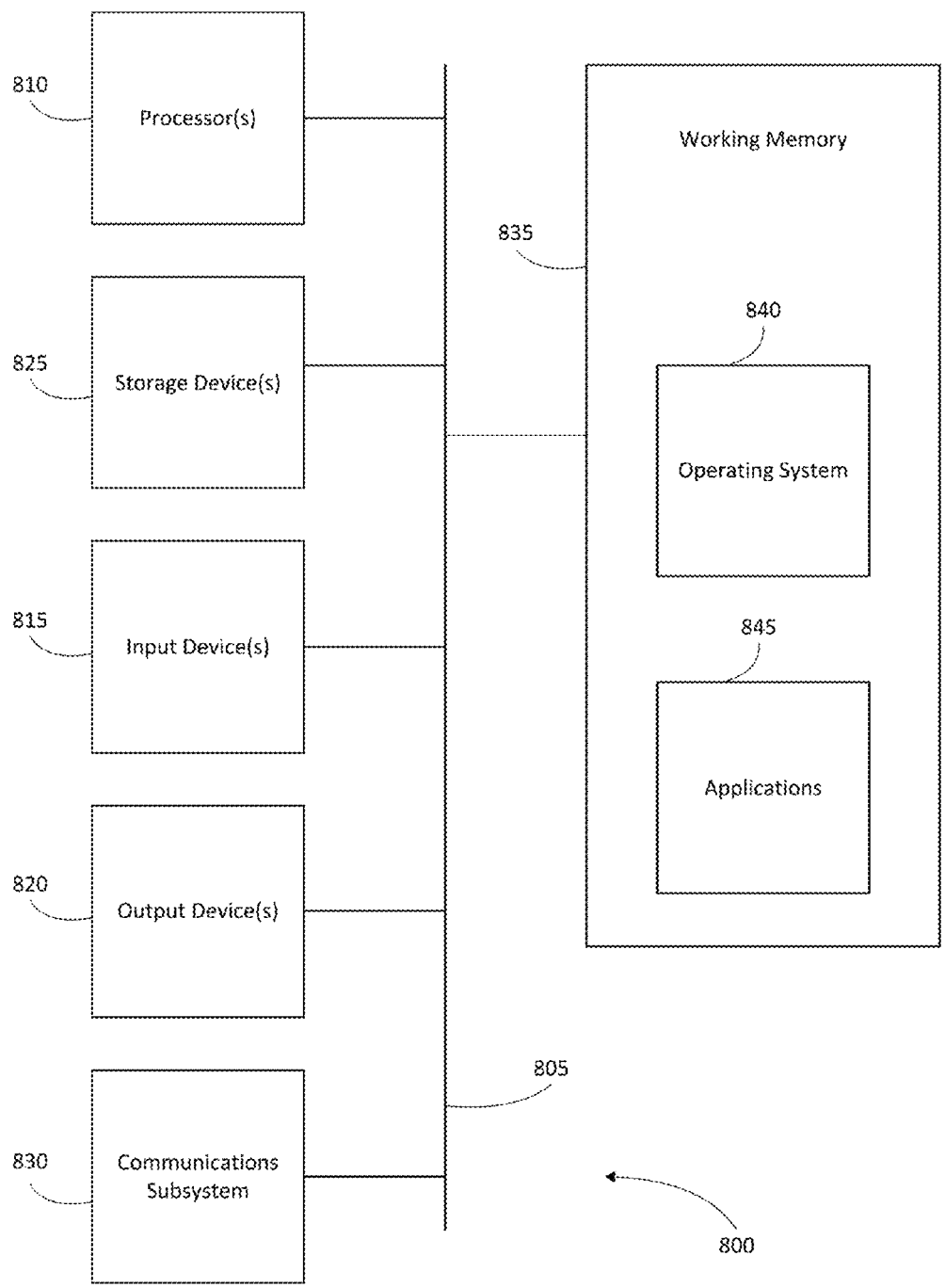
FIG. 8 is a generalized schematic diagram illustrating a computer system, in accordance with various embodiments.

FIG. 8 provides a schematic illustration of one embodiment of a computer system 800 that can perform the methods provided by various other embodiments, as described herein, and/or can function as the users 120 or processor s135-1 to 135-*n* described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer systems, and/or with any other devices described herein. In many embodiments, the computer system 800 will further comprise a working memory 835, which can include a RAM or ROM device, as described above.

The computer system 800 also may comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operation in a specific fashion. In an embodiment implemented using the computer system 800, various computer readable media might be involved in providing instructions/code to processor(s) 810 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 825. Volatile media includes, without limitation, dynamic memory, such as the working memory 835. Transmission media includes, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
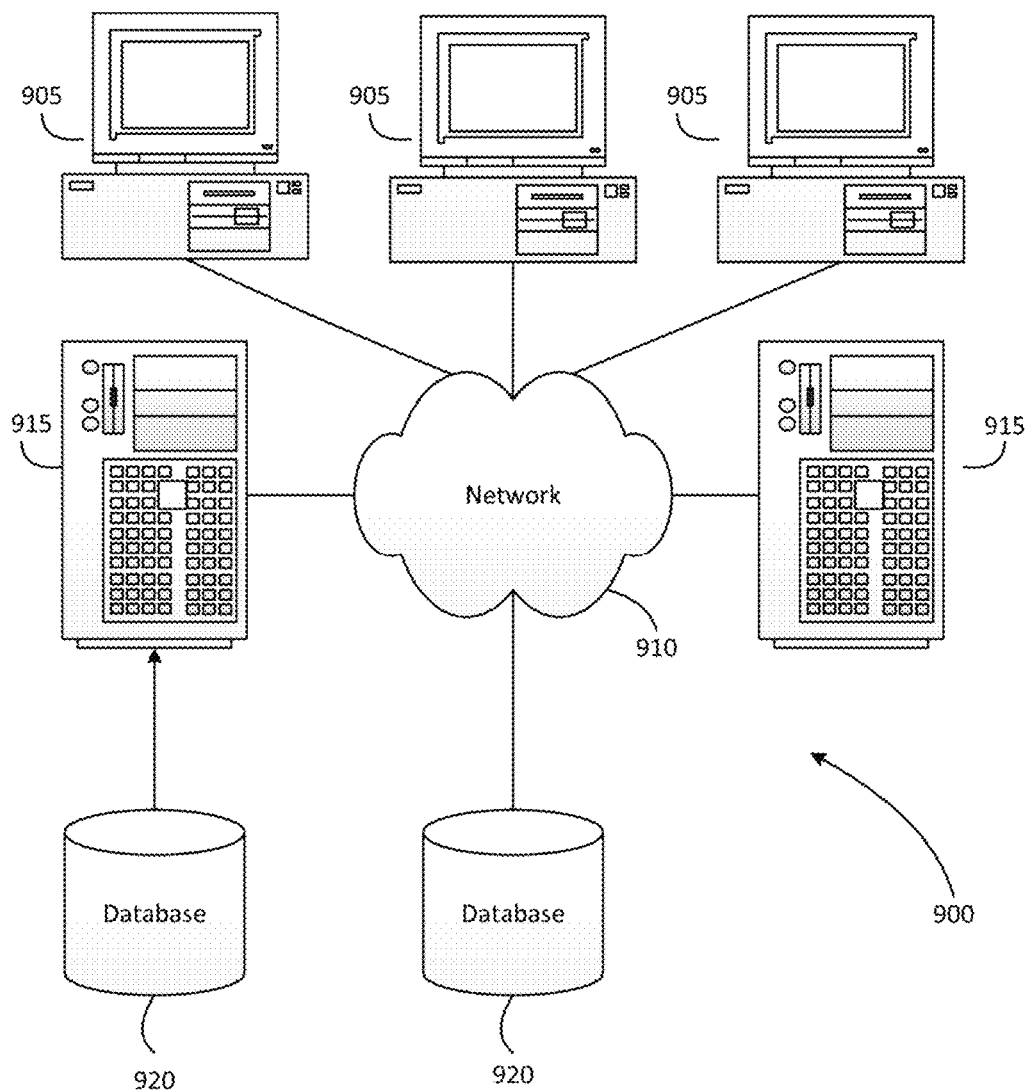
FIG. 9 is a block diagram illustrating a networked system of computers, which can be used in accordance with various embodiments.

As noted above, a set of embodiments comprises systems for recovery of information from commercial web portals. FIG. 9 illustrates a schematic diagram of a system 900 that can be used in accordance with one set of embodiments. The system 900 can include one or more user computers 905. A user computer 905 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 905 can also have any of a variety of applications, including one or more applications configured to perform methods provided by various embodiments (as described above, for example), as well as one or more office applications, database client and/or server applications, and/or web browser applications. Alternatively, a user computer 905 can be any other electronic device, such as a thin-client computer, Internet-enabled mobile telephone, and/or personal digital assistant, capable of communicating via a network (e.g., the network 910 described below) and/or of displaying and navigating web pages or other types of electronic documents. Although the exemplary system 900 is shown with three user computers 905, any number of user computers can be supported.

Certain embodiments operate in a networked environment, which can include a network 910. The network 910 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 910 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915. Merely by way of example, in some cases, one or more servers 915 might be configured to operate a core system of an operated software agent, while other servers 915 (or clients) can be configured to operate remote control modules, as described above. In some instances, a plurality of servers 915 (i.e., processors) might be configured to operate in a grid or "cloud" configuration, in which computing resources (memory, processors, etc.) are shared as a pool, on which different applications (e.g., software agents) can draw.

In some cases, one of the servers 915 may be a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 905 and/or another server 915. In some embodiments, an application server can create web pages dynamically for displaying the information in accordance with various embodiments. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920, such as those described above. The location of the database(s) 920 is discretionary: merely by way of example, a database 920a might reside on a storage medium local to (and/or resident in) a server 915a (and/or a user computer 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of provisioning credentials to an automated software agent for accessing an insurance company web portal for the purpose of obtaining patient-specific information for a patient of interest, the method comprising:
   providing a credentials database for storing credentials useable by the automated software agent for accessing an insurance company web portal;
   associating, with a computer system, each credential with one or more roles the credential can enable on the insurance company web portal, without associating the one or more roles with any user, wherein each role comprises a user-independent role associated with the corresponding credential, wherein each credential is independent of any user;
   storing, with the computer system and in the credentials database, each credential and its associated user-independent roles;
   identifying, with the automated software agent, a credential for use in accessing a select insurance company web portal, wherein the credential is one of authorized for exclusive use by one instance of the automated software agent at a time, authorized for use by a finite number of concurrent instances of the automated software agent, or authorized for use by an unlimited number of concurrent instances of the automated software agent;
   querying, with the automated software agent, the database to determine if the identified credential can enable a select user-independent role or a select group of user-independent roles;
   querying, with the automated software agent, the database to determine if the identified credential is available for use; and
   providing, with the computer system, the identified credential to the automated software agent for its use in accessing the select insurance company web portal only if the identified credential can enable the select user-independent role or group of user-independent roles and the identified credential is available for use and, for each credential with a limited use role, after setting an in-use window having an in-use expiration time and associating the in-use expiration time with the identified credential and storing the in-use expiration time in the credentials database.

2. The method of claim 1, further comprising, if the user cannot access the insurance company web portal using the identified credential:
   associating, with the computer system, the identified credential with a lockout window having a lockout expiration time;
   storing, with the computer system, the lockout expiration time in the credentials database; and
   preventing, by the computer system, use of the credential until termination of the lockout expiration time.

3. The method of claim 1 further comprising:
   associating, with the computer system, each credential with any expiration date set by the insurance company web portal; and
   updating, with the computer system, the credential as necessary to allow access to the insurance company web portal.

4. The method of claim 1 further comprising:
   determining, with the computer system, if a credential to be stored in the credentials database may be used simultaneously by unlimited multiple users to access an insurance company web portal;
   associating, with the computer system, the credential with an unlimited use role; and
   for each credential with an unlimited use role, setting, by the computer system, the in-use expiration time prior to the credential being returned to a user as an identified credential, wherein the in-use expiration time is in the past after the credential is returned to the user as the identified credential, resulting in the credential always being available to a user.

5. The method of claim 1 further comprising:
   determining, with the computer system, if a credential stored in the credentials database may be used simultaneously by a select number of multiple users to access an insurance company web portal;
   associating, with the computer system, a counter with the credential to count the number of users simultaneously using the credential; and
   not returning, by the computer system, the credential to the automated software agent if number of users simultaneously using the credential counted by the counter is equal to the select number of users.

6. The method of claim 1 wherein there are a plurality of instances of the automated software agent, each of the plurality of the instances of the automated software agent having associated therewith an identifier that uniquely identifies that instance of the automated software agent within the computer system, the method further comprising:
   maintaining, with the computer system, a list of identifiers of currently running instances of the automated software agent, the list associating each currently running instance of the automated software agent with one or more credentials currently used by that currently-running instance of the automated software agent, a status of that instance of the automated software agent, and a set of one or more dispatch parameters corresponding to that instance of the automated software agent.

7. The method of claim 6 further comprising:
   identifying, with the computer system and from the list of identifiers, a conflict between two or more instances of the currently running automated software agent; and
   resolving, with the computer system, the conflict by terminating one or more of the currently running instances of the automated software agent.

8. The method of claim 6 further comprising:
   determining, with the computer system and from the list of identifiers, that a currently running instance of the automated software agent has failed; and
   terminating, with the computer system, the failed currently running instance of the automated software agent.

9. The method of claim 8 further comprising analyzing, with the computer system, how the instances of the automated software agent access resources for the purpose of eliminating future conflicts between instances of the automated software agent acquiring a credential.

10. A computer system comprising:
   one or more processors;
   a database operatively associated with at least one of the one or more processors;
   an automated software agent operatively associated with at least one of the processors;
   a set of instructions executable by at least one of the one or more processors, to cause the at least one of the one or more processors to perform one or more operations, the set of instructions comprising:

instructions for creating a credentials database for storing credentials useable by the automated software agent for accessing an insurance company web portal;

instructions for associating each credential with one or more roles the credential can enable on the insurance company web portal, without associating the one or more roles with any user, wherein each role comprises a user-independent role associated with the corresponding credential, wherein each credential is independent of any user;

instructions for storing, in the credentials database, each credential and its associated user-independent roles;

instructions for identifying, with the automated software agent, a credential for use in accessing a select insurance company web portal, wherein the credential is one of authorized for exclusive use by one instance of the automated software agent at a time, authorized for use by a finite number of concurrent instances of the automated software agent, or authorized for use by an unlimited number of concurrent instances of the automated software agent;

instructions for querying, with the automated software agent, the credentials database to determine if the identified credential can enable a select user-independent role or a select group of user-independent roles;

instructions for querying, with the automated software agent, the credentials database to determine if the identified credential is available for use; and instructions for providing the identified credential to the automated software agent for its use in accessing the select insurance company web portal only if the identified credential can enable the select user-independent role or group of user-independent roles and the identified credential is available for use and after setting an in-use window having an in-use expiration time and associating the in-use expiration time with the identified credential and storing the in-use expiration time in the credentials database.

11. An apparatus comprising:

one or more processors;

a non-transitory computer readable medium having stored thereon a set of instructions executable by at least one of the one or more processors, to cause the at least one of the one or more processors to perform one or more operations, the set of instructions comprising:

instructions for creating a credentials database for storing credentials useable by an automated software agent for accessing an insurance company web portal;

instructions for associating each credential with one or more roles the credential can enable on the insurance company web portal, without associating the one or more roles with any user, wherein each role comprises a user-independent role associated with the corresponding credential, wherein each credential is independent of any user;

instructions for storing, in the credentials database, each credential and its associated user-independent roles;

instructions for identifying, with the automated software agent, a credential for use in accessing a select insurance company web portal, wherein the credential is one of authorized for exclusive use by one instance of the automated software agent at a time, authorized for use by a finite number of concurrent instances of the automated software agent, or authorized for use by an unlimited number of concurrent instances of the automated software agent;

instructions for querying, with the automated software agent, the credentials database to determine if the identified credential can enable a select user-independent role or a select group of user-independent roles;

instructions for querying, with the automated software agent, the credentials database to determine if the identified credential is available for use; and instructions for providing the identified credential to the automated software agent for its use in accessing the select insurance company web portal only if the identified credential can enable the select user-independent role or group of user-independent roles and the identified credential is available for use and after setting an in-use window having an in-use expiration time and associating the in-use expiration time with the identified credential and storing the in-use expiration time in the credentials database.

* * * * *